(12) United States Patent
Powell et al.

(10) Patent No.: US 7,068,286 B2
(45) Date of Patent: Jun. 27, 2006

(54) EDGE SMOOTHING SYSTEMS AND METHODS

(75) Inventors: Lee Powell, Oakland, CA (US); Edwin Lee Rose, Mill Valley, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 118 days.

(21) Appl. No.: 10/967,095

(22) Filed: Oct. 15, 2004

(65) Prior Publication Data

US 2005/0110799 A1    May 26, 2005

Related U.S. Application Data

(60) Provisional application No. 60/512,339, filed on Oct. 17, 2003.

(51) Int. Cl.
*G09G 5/00*    (2006.01)

(52) U.S. Cl. .................................................... 345/611

(58) Field of Classification Search ......... 345/611–616
See application file for complete search history.

(56) References Cited

U.S. PATENT DOCUMENTS

| | | | |
|---|---|---|---|
| 4,672,370 A * | 6/1987 | Yu ............................... | 345/17 |
| 5,357,583 A * | 10/1994 | Sato et al. .................. | 382/269 |
| 5,440,676 A | 8/1995 | Alappat et al. | |
| 5,519,823 A | 5/1996 | Barkans | |
| 6,340,994 B1 * | 1/2002 | Margulis et al. ............ | 348/625 |

2004/0224775 A1    11/2004    Wood et al.

OTHER PUBLICATIONS

Kubota, T. et al., "Edge Based Probabilistic Relaxation of Sub-pixel Contour Extraction," Proc. 3$^{rd}$ Int. Workshop on Energy Min. Methods in Comp. Vision and Patt. Recognt'n, 2001, pp. 328-343.

Herrell, R. et al., "High Quality Polygon Edging," Computer Graphics and Applications, IEEE, vol.: 15, Iss. 04, Jul. 1995, pp. 68-73.

Bala, K. et al., "Combining Edges and Points for High-Quality Rendering," ACM Trans on Graphics, vol. 22, Iss. 03, Jul. 2003, pp. 631-640.

* cited by examiner

*Primary Examiner*—Michael Razavi
*Assistant Examiner*—Eric Woods
(74) *Attorney, Agent, or Firm*—Townsend and Townsend and Crew LLP (57)    ABSTRACT

A method of processing video data includes directing the video data set toward a display device. The display device has horizontal resolution $h_1$ and vertical resolution $v_1$. The video data has horizontal resolution $h_2$ and vertical resolution $v_2$. The video data includes a plurality of scan lines. At least one scan line has at least one line span representing the projection onto that scan line of a graphics vector rendered in the video data. The graphics vector has a slope and the line span has a color and a width. The method includes, for a resultant video data set having a horizontal resolution less than $h_2$, determining a color of an edge resultant pixel in a resultant scan line using, at least in part, the slope of the graphics vector at an edge sub-pixel.

9 Claims, 3 Drawing Sheets

EDGE SMOOTHING SYSTEMS AND METHODS

CROSS-REFERENCES TO RELATED APPLICATIONS

This application is a non-provisional of, and claims the benefit of, now abandoned, commonly assigned U.S. Provisional Patent Application No. 60/512,339, entitled "METHOD AND SYSTEM FOR PROVIDING EDGE SMOOTHING," filed on Oct. 17, 2003, by Lee Powell, et al., the entire disclosure of which is herein incorporated by reference for all purposes.

BACKGROUND OF THE INVENTION

The present invention generally relates to computer graphics and, more specifically, to methods and systems for accelerating vector graphics rendering.

Edge smoothing is faced with the technical challenge of improving the appearance of graphics rendered at minimal vertical resolution. To achieve high frame rates in, for example, Macromedia Flash5, a movie must be authored with a limited amount of animation and/or run in Flash5's "Low Quality" graphics mode. In other words, "Medium Quality" and "High Quality" graphics modes are generally not available when high frame rates are desired.

The Flash5 vector graphics rendering engine ("FVGRE") generates graphics data as horizontal line spans packed into each scan line of a rasterized screen. In "Low Quality" mode, images are rendered at the same resolution as the screen, without an anti-aliasing filter. In "Medium Quality" mode, images are rendered at 200% of the screen's horizontal and vertical resolution, and bilinear interpolation is used as an anti-aliasing filter that scales the image down to screen size. In "High Quality" mode, images are rendered at 400% of the screen's horizontal and vertical resolution, and bilinear interpolation is used as an anti-aliasing filter that scales the image down to screen size.

When the horizontal resolution of an image is increased, the FVGRE generates proportionally wider line spans, but the number of discreet line spans its must generate remains unchanged. Thus, increasing the horizontal resolution of the raster has minimal effect on rendering speed.

When the vertical resolution of an image is increased, the FVGRE generates additional horizontal line spans to cover the newly created scan lines. Thus, increasing the vertical resolution of the raster reduces rendering speed in proportion to the number of additional scan lines.

For the foregoing reasons, systems and methods are needed that efficiently improve resolution.

BRIEF SUMMARY OF THE INVENTION

Embodiments of the invention thus provide a method of processing video data. The video data is to be displayed on a display device having horizontal resolution $h_1$ and vertical resolution $v_1$. The video data has horizontal resolution $h_2$ and vertical resolution $v_2$. The video data includes a plurality of scan lines. At least one scan line has at least one line span representing the projection onto that scan line of a graphics vector rendered in the video data. The graphics vector has a slope and the line span has a color and a width. The method includes, for a resultant video data set having a horizontal resolution less than $h_2$, determining a color of an edge resultant pixel in a resultant scan line using, at least in part, the slope of the graphics vector at an edge sub-pixel. The method also includes directing the resultant video data set toward the display device.

In some embodiments, the edge resultant pixel may be a left edge resultant pixel and the edge sub-pixel may be a left edge sub-pixel. Determining a color of an edge resultant pixel may include determining whether the slope is greater than or equal to 0.4 and whether the edge sub-pixel is at an even location. Determining a color of an edge resultant pixel also may include, based at least in part upon the determination, determining the color of the edge resultant pixel to be 25% of a color of an immediately adjacent prior sub-pixel plus 75% of the line span color. Determining a color of an edge resultant pixel may include determining whether the slope is greater than or equal to 0.4 and whether the edge sub-pixel is at an odd location. Determining a color of an edge resultant pixel also may include based upon the determination, determining the color of the edge resultant pixel to be 75% of a color of an immediately adjacent prior sub-pixel plus 25% of the line span color. Determining a color of an edge resultant pixel includes determining whether the slope is less than 0.4 and, based at least in part upon the determination, determining the color of the edge resultant pixel to be 50% of a color of an immediately adjacent prior sub-pixel plus 50% of the line span color. The method may include determining a color of a second resultant pixel to be 25% of the color of the immediately adjacent prior sub-pixel plus 75% of the line span color. The method may include determining a width of a resultant line span based, at least in part, on the width of the line span. Determining a width of a resultant line span may include determining whether the edge sub-pixel is at an even location and, based at least in part on the determination, determining the width of the resultant line span to be the integer result of the width of the line span divided by 2. Determining a width of a resultant line span may include determining whether the edge sub-pixel is at an odd location and, based at least in part on the determination, determining the width of the resultant line span to be the integer result of the width of the line span increased by one and the result divided by 2. The method may include determining whether the current line span is a lowest line span on a side of a vertical edge and, based at least in part on the determination, disabling an edge smoothing process on a next line span.

In some embodiments, $h_2=2h_1$, and $v_2=1.5v_1$. The resultant video data set may have a plurality of horizontal scan lines each representing a plurality of pixels, whereby the pixels are comprised by groups of three vertically-aligned pixels comprising a top pixel, a middle pixel, and a bottom pixel, each pixel having a color. The method may include, for each group of three vertically-aligned pixels, determining a color of a top resultant pixel to be 75% of the top pixel's color plus 25% of the middle pixel's color and determining a color of a bottom resultant pixel to be 25% of the middle pixel's color plus 75% of the bottom pixel's color.

In further embodiments, a graphics device includes a vector graphics rendering engine configured to produce video data to be displayed on a display device. The video data includes a horizontal resolution and a vertical resolution. The horizontal resolution is twice a horizontal resolution of the display device. The video data includes a plurality of scan lines. At least one scan line has at least one line span representing the projection on that scan line of a graphics vector rendered in the video data. The graphics vector has a slope and the line span has a color and a width. The graphics device also includes at least one filter configured to receive the video data from the vector graphics rendering engine and determine a color of an edge resultant pixel in a resultant scan line using, at least in part, the slope of the graphics vector at an edge sub-pixel and direct a resultant video data set that includes the resultant scan line toward the display device.

In still other embodiments, the edge resultant pixel may include a left edge resultant pixel and the edge sub-pixel may include a left edge sub-pixel. The at least one filter may be further configured to determine the color of the edge resultant pixel at least in part by determining whether the slope is greater than or equal to 0.4 and whether the edge sub-pixel is at an even location and, based at least in part upon the determination, determining the color of the edge resultant pixel to be 25% of a color of an immediately adjacent prior sub-pixel plus 75% of the line span color. The at least one filter may be further configured to determine the color of the edge resultant pixel at least in part by determining whether the slope is greater than or equal to 0.4 and whether the edge sub-pixel is at an odd location and, based upon the determination, determining the color of the edge resultant pixel to be 75% of a color of an immediately adjacent prior sub-pixel plus 25% of the line span color. The at least one filter may be further configured to determine the color of the edge resultant pixel at least in part by determining whether the slope is less than 0.4 and, based at least in part upon the determination, determining the color of the edge resultant pixel to be 50% of a color of an immediately adjacent prior sub-pixel plus 50% of the line span color. The at least one filter may be further configured to determine a color of a second resultant pixel to be 25% of the color of the immediately adjacent prior sub-pixel plus 75% of the line span color. The at least one filter may be further configured to determining a width of a resultant line span based, at least in part, on the width of the line span.

In still other embodiments, the at least one filter may be further configured to determining a width of a resultant line span by determining whether the edge sub-pixel is at an even location and, based at least in part on the determination, determining the width of the resultant line span to be the integer result of the width of the line span divided by 2. The at least one filter may be further configured to determining a width of a resultant line span by determining whether the edge sub-pixel is at an odd location and, based at least in part on the determination, determining the width of the resultant line span to be the integer result of the width of the line span increased by one and the result divided by 2. The at least one filter may be further configured to determine whether the current line span is a lowest line span on a side of a vertical edge and, based at least in part on the determination, disable an edge smoothing process on a next line span.

In some embodiments of the graphics device, the vertical resolution is 1.5 times a vertical resolution of the display device. The resultant video data set includes a plurality of horizontal scan lines each representing a plurality of pixels, whereby the pixels are comprised by groups of three vertically-aligned pixels comprising a top pixel, a middle pixel, and a bottom pixel, each pixel having a color. The graphics device may include at least a second filter configured to, for each group of three vertically-aligned pixels, determine a color of a top resultant pixel to be 75% of the top pixel's color plus 25% of the middle pixel's color, and determine a color of a bottom resultant pixel to be 25% of the middle pixel's color plus 75% of the bottom pixel's color.

In still other embodiments, a graphics device includes means for receiving video data to be displayed on a display device from a vector graphics rendering engine. The video data may include a horizontal resolution and a vertical resolution. The horizontal resolution may be twice a resolution of the display device. The video data includes a plurality of scan lines. At least one scan line has at least one line span representing the projection on that scan line of a graphics vector rendered in the video data. The graphics vector has a slope and the line span has a color and a width. The graphics device also includes means for determining, in a resultant video data set, a color of an edge resultant pixel in a resultant scan line using, at least in part, the slope of the graphics vector at an edge sub-pixel.

In yet other embodiments, a computer-readable medium has stored thereon code for receiving video data to be displayed on a display device from a vector graphics rendering engine. The video data includes a horizontal resolution and a vertical resolution. The horizontal resolution is twice a resolution of the display device. The video data includes a plurality of scan lines. At least one scan line has at least one line span representing the projection on that scan line of a graphics vector rendered in the video data. The graphics vector has a slope and the line span has a color and a width. The computer-readable medium also includes code for determining, in a resultant data set, a color of an edge resultant pixel in a resultant scan line using, at least in part, the slope of the graphics vector at an edge sub-pixel.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The present invention in the form of one or more exemplary embodiments will now be described. In one embodiment, the present invention provides extensions to the Macromedia Flash5 vector graphics rendering engine. These extensions can be used to replace the anti-aliasing filters used in Flash5 "Medium Quality" and "High Quality" graphics modes. The algorithms of the present invention, as will be further described below, provide comparable levels of graphics quality at accelerated rendering speeds. As is apparent to those skilled in the art in light of this disclosure, although the exemplary embodiments will be described as an extension of Flash5, this is not a requirement. The teachings herein may be used in combination with other graphics engines.

The algorithms or techniques of the present invention use the slope of each rendered vector to determine the appropriate amount of anti-aliasing to apply at each line span intersection. As a result, compensation for vectors with near-horizontal slopes an be achieved. In some embodiments, the algorithm involves the following: determination of optimal weighting coefficients for anti-aliasing horizontal line spans; extraction of vector slope information at line span intersections; determination of optimal anti-aliasing coefficients modified by vector slope information; elimination of undesirable graphic artifacts due to vector slope discontinuities; and determination of optimal weighting coefficients for vertical anti-aliasing in High Quality mode.

Figure 1:
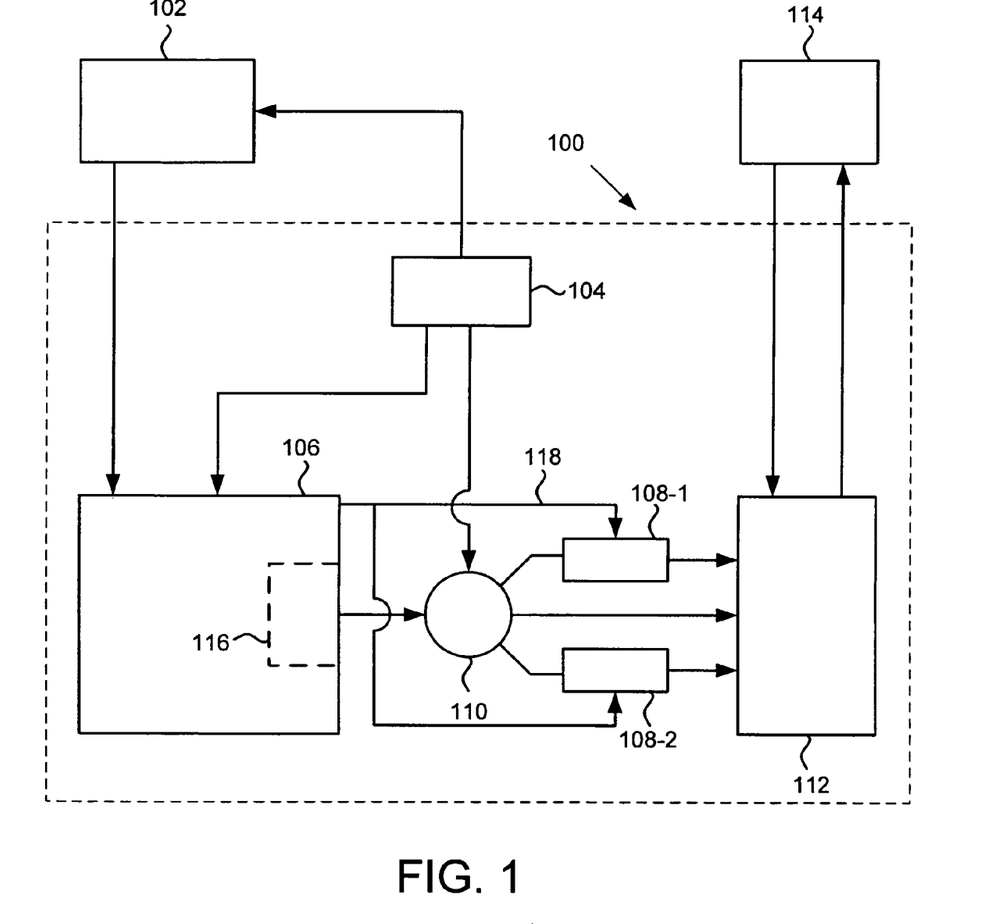
FIG. 1 illustrates a simplified block diagram of an exemplary video controller according to embodiments of the invention.

Having described embodiments of the present invention generally, attention is directed to FIG. 1, which illustrates an exemplary video driver 100 according to a specific embodiment of the invention. Those skilled in the art will appreciate that the driver 100 is merely exemplary of a number of embodiments according to the invention. Further, no inference should be drawn from the use of the term "driver" to refer to the device in which embodiments of the invention are implemented. "Driver" is to be interpreted broadly so as to refer to any device that performs according to the description herein. The driver 100 may be embodied in an ASIC, or other appropriate device or arrangement. According to this example, the driver 100 implements one or more graphics renderings algorithms that provide improved resolution without a corresponding increase in processing time.

The driver 100 receives video data from a video data source 102. The video data source 102 may be, for example, video RAM, or the like. The driver 100 includes a controller 104, a vector graphics rendering engine 106, one or more filters 108, and a filter selector 110. The driver 100 also may include a frame buffer 112, although the frame buffer need not be integral with the driver 100. The video driver 100 sends video data to an output device 114.

The controller 104 may be any of a wide variety of devices, as is apparent to those skilled in the art. For example, the controller 104 may be a clock, a processor, or the like. In this specific embodiment, the controller 104 sends signals to the video data source 102 that cause data to move into the vector graphics rendering engine 106.

The vector graphics rendering engine 106 may be any of a variety of graphics devices. In a specific embodiment, the vector graphics rendering engine 106 is a Macromedia Flash5 vector graphics rendering engine.

The vector graphics rendering engine 106 includes a back buffer 116 that, in this embodiment, buffers one or more rasterized frames of video information. Control signals from the controller 104 determine the horizontal and vertical resolution of the rasterized frame.

The rasterized frames of video data may be processed through one or more of a number of filters 108. Which filter 108 processes the video data may be determined by the controller 104 via the filter selector 110. The video data also may be sent directly to the frame buffer 112 unprocessed.

In a first mode, the video data is processed through a medium quality filter 108-1. The operation of the medium quality filter will be described in detail below. It should be noted that, in addition to the rasterized video data, the filter may receive slope information from the vector graphics engine 106 via a connection 118. The video data is then passed to the frame buffer 112.

In a second mode, the video data is processed though a high quality filter 108-2. The operation of the high quality filter also will be described in detail below. The high quality filter 108-2 also may receive slope information from the vector graphics engine 106 via the connection 118.

It should be appreciated that the filter arrangement illustrated and described here is merely exemplary and many other embodiments are possible. For example, in the high quality mode, data may first pass through the medium quality filter 108-1 before passing through the high quality filter 108-2 or vice versa. In some embodiments, horizontal and vertical filters may replace the medium quality filter 108-1 and the high quality filter 108-2. Further, the filters may be implemented completely in software. Further still, the filter selector 110 need not exist as a distinct hardware device. The filter selector 110 may be implemented in software or merely as a sequence of logic gates enabled by the controller 104. Many other examples are possible and apparent to those skilled in the art in light of this disclosure.

Having described an exemplary video driver 100 according to embodiments of the invention, the ensuing description will describe two exemplary methods that may be implemented in the exemplary video driver 100 or other appropriate device: a Medium Quality Edge Smoothing Algorithm, and a High Quality Edge Smoothing Algorithm. The methods may be implemented simultaneously in the same device, whereby a user may select among them. Alternatively, the methods may be implemented individually or with other embodiments. Many examples are possible. Although the exemplary methods will be described as if implemented in the driver 100 of FIG. 1 (specifically the filters 108), this is not a requirement, as is apparent to those skilled in the art.

Medium Quality Edge Smoothing Algorithm

Figure 2:
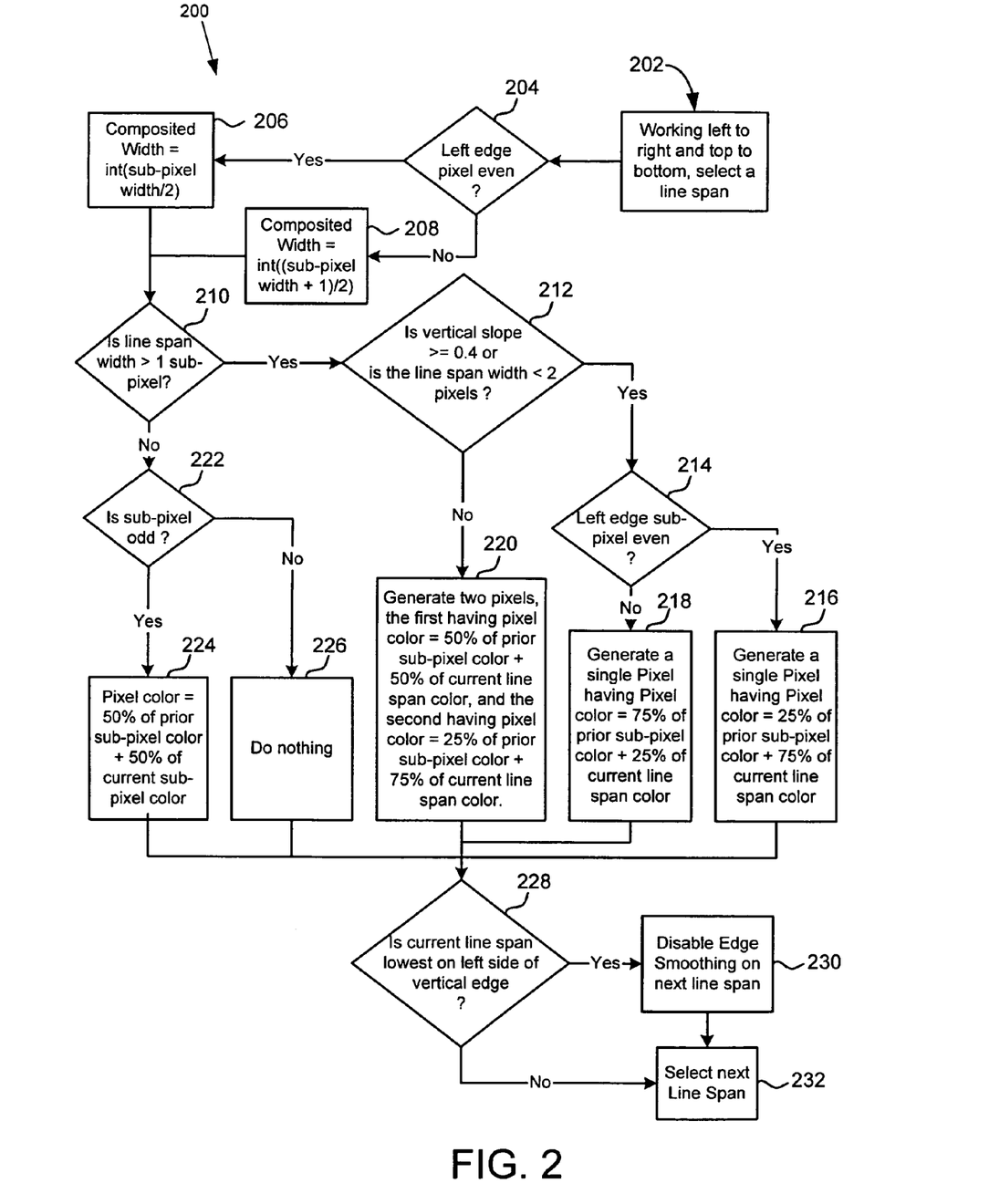
FIG. 2 illustrates a flow diagram for a medium quality edge smoothing method according to embodiments of the invention.

FIG. 2 illustrates a first exemplary method 200, hereinafter referred to as "Medium Quality Edge Smoothing" ("MQES") mode. In MQES, the horizontal resolution of images is rendered by the vector graphics engine 106 to the back buffer 116 at twice the horizontal resolution of the display device 114. The vertical resolution is rendered at the same resolution as the vertical resolution of the display device 114. Thus, this generates a raster with twice the number of "sub-pixels" in each horizontal scan line, which, in most cases, results in little performance degradation. At this point, the back buffer 116 contains a left-to-right, top-to-bottom, rasterized frame of video data. In this embodiment, line spans are represented in the data by multi-bit strings that identify a grayscale intensity for each pixel of the line segment. In color display systems, the multi-bit string may include information for al three color components. In other embodiments, sequential frames may represent color components. Other examples are possible. Those skilled in the art will appreciate that the ensuing description, although described in terms of rendering a monochrome frame, also may apply to rendering a color frame by repeating the process or repeating operations within the process.

The method 200 begins at block 202 by selecting the first line span in the left-to-right, top-to-bottom raster. The composited width of the line span is then determined. At block 204, a determination is made whether the left edge of the line span starts at an even-number sub-pixel. If so, at block 206 the line span's composited width is calculated by dividing its sub-pixel width by two and truncating the quotient down to the nearest integer. Otherwise, at block 208 the line span's composited width is calculated by incrementing its sub-pixel width by one, dividing the result by two, and truncating the quotient down to the nearest integer.

Next, at block 210 a determination is made whether the line span's sub-pixel width is greater than one. If so, at block 212 a determination is made whether the vertical slope of the line segment at that point is greater than or equal to 0.4 or whether the composited line span is less than two pixels in width (the slope information is provided to the filter 108-1 by the vector graphics rendering engine 106). If both these conditions are true, a determination is made at block 214 whether the left edge sub-pixel is even (at an even location). If the left edge of the current line span starts at an even sub-pixel, the color of the interpolated pixel is 25% of the prior sub-pixel plus 75% of the current line span's color. Otherwise, at block 218, if the left edge of the current line span starts at an odd sub-pixel, the color of the interpolated pixel is 75% of the prior sub-pixel plus 25% of the current line span's color.

If the vertical slope of the line span at the current location is less than 0.4, and the line span is at least four sub-pixels in width (two composited pixels), as determined at block 212, then two interpolated pixels are generated, replacing the first two pixels of the current line span. The color of the first pixel is 50% of the prior sub-pixel plus 50% of the current line span's color. The color of the second pixel is 25% of the prior sub-pixel plus 75% of the current line span's color.

If the current line span contains only a single sub-pixel, as determined at block 210, then the sub-pixel may be retained for further compositing with the following line span. At block 222, a determination is made whether the sub-pixel is at an odd-numbered position. If so, a single pixel is composited at block 224 whose color is 50% of the prior sub-pixel plus 50% of the current sub-pixel. If the sub-pixel is at an even-numbered position, no composited pixel is generated, as indicated by block 226.

At block 228, a determination is made whether the current line span is the lowest line span on the left side of a vertical edge. If so, as indicated by block 230, edge smoothing is disabled on the following line span immediately to its right. This prevents flaring of the right edge of a line span at the lower right corner of an object. The next line span is selected at block 232, and the process is repeated for the entire raster.

Those skilled in the art will appreciate that the foregoing description is merely exemplary of a number of embodiments that may include more, fewer, or different steps than those illustrated and described here. Further, other exemplary embodiments may traverse steps in different orders than illustrated and described here.

High Quality Edge Smoothing Algorithm

Figure 3:
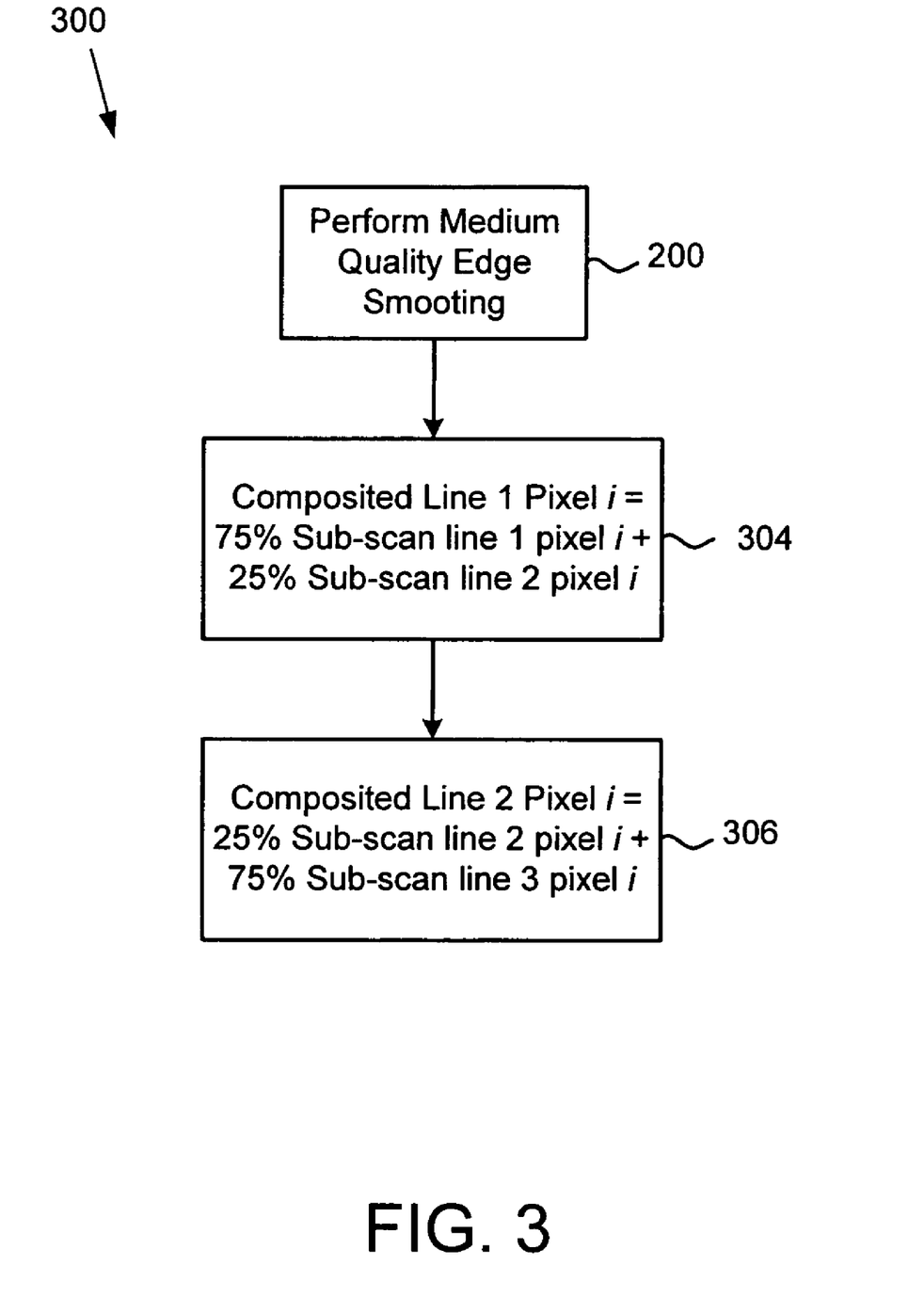
FIG. 3 illustrates a flow diagram for a high quality edge smoothing method according to embodiments of the invention.

FIG. 3 illustrates a second exemplary method 300, hereinafter referred to as "High Quality Edge Smoothing" ("HQES") mode. In HQES, as with MQES, the horizontal resolution of images is rendered by the vector graphics engine 106 to the back buffer 116 at twice the horizontal resolution of the display device 114. The vertical resolution however, is rendered to 150% of the vertical resolution of the display device 114. This Produces a raster with twice the number of "sub-pixels" in each horizontal scan line, and three "sub-scan lines" for each pair of horizontal scan lines in the composited screen. In this embodiment, a three-line pixel buffer may be used for the horizontal compositing of each set of three sub-scan lines. This may comprise using MQES as described above and indicated by block 200 of FIG. 3. The three sub-scan lines then may be composited into two scan lines as follows.

At block 304, the upper scan line is composited from the first two sub-scan lines in the three-line pixel buffer. The color of each composited pixel is interpolated using 75% of the pixel from the first sub-scan line plus 25% of the pixel from the second sub-scan line.

Next, at block 306, the lower scan line is composited from the last two sub-scan lines in the three-line pixel buffer. The color of each composite pixel is interpolated using 25% of the pixel from the second sub-scan line plus 75% of the pixel from the third sub-scan line.

Embodiments of the present invention provide high-speed alternatives to anti-alias filters used in vector graphics rendering engines, such as Flash5's "Medium Quality" and "High Quality" graphics modes, while maintaining comparable levels of graphics quality. This allows movies to be created at higher frame rates without sacrificing image quality.

When used in combination with Flash5, embodiments of the present invention may be used with any type of Flash5 content and is intended to be compatible with all previously-published Flash5 movies. No special authoring techniques are required to make full use of it in most embodiments.

Any of the functions or methods described in this application can be embodied as code on a computer readable medium. The computer readable medium may comprise any suitable optical, electronic, or magnetic mode of data storage. The computer readable medium may be incorporated into an interactive apparatus using a display. In addition, code for any of the functions or methods described herein may be created using any suitable programming language including C, C++, etc.

Embodiments of the invention can be used in an interactive apparatus using a display screen. Examples of such interactive apparatuses are described in U.S. patent application Ser. Nos. 10/775,830, 10/776,012, 60/446,829, and 60/512,326, which are herein incorporated by reference in their entirety for all purposes.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

All references, patent applications, and patents mentioned above are herein incorporated by reference in their entirety for all purposes. None of them is admitted to be prior art to the presently claimed inventions.

What is claimed is:

1. A computer-implemented method of processing video data to be displayed on a display device having horizontal resolution h1 and vertical resolution v1, wherein the video data has horizontal resolution h2 and vertical resolution v2, wherein the video data comprises a plurality of scan lines, wherein at least one scan line has at least one line span representing the projection onto that scan line of a graphics vector rendered in the video data, and wherein the graphics vector has a slope and the line span has a color and a width, the method comprising:

for a resultant video data set having a horizontal resolution less than h2, determining a color of an edge resultant pixel in a resultant scan line using, at least in part the slope of the graphics vector at an edge sub-pixel; and directing the resultant video data set toward the display device;

wherein determining a color of an edge resultant pixel comprises:

determining whether the slope is greater than or equal to 0.4 and whether the edge sub-pixel is at an even location; and based at least in part upon the determination, determining the color of the edge resultant pixel to be 25% of a color of an immediately adjacent prior sub-pixel plus 75% of the line span color.

2. A computer-implemented method of processing video data to be displayed on a display device having horizontal resolution h1 and vertical resolution v1, wherein the video data has horizontal resolution h2 and vertical resolution v2, wherein the video data comprises a plurality of scan lines, wherein at least one scan line has at least one line span representing the projection onto that scan line of a graphics vector rendered in the video data, and wherein the graphics vector has a slope and the line span has a color and a width, the method comprising:

for a resultant video data set having a horizontal resolution less than h2, determining a color of an edge resultant pixel in a resultant scan line using, at least in part the slope of the graphics vector at an edge sub-pixel; and directing the resultant video data set toward the display device;

wherein determining a color of an edge resultant pixel comprises:

determining whether the slope is greater than or equal to 0.4 and whether the edge sub-pixel is at an odd location; and based upon the determination, determining the color of the edge resultant pixel to be 75% of a color of an immediately adjacent prior sub-pixel plus 25% of the line span color.

3. A computer-implemented method of processing video data to be displayed on a display device having horizontal resolution h1 and vertical resolution v1, wherein the video data has horizontal resolution h2 and vertical resolution v2, wherein the video data comprises a plurality of scan lines, wherein at least one scan line has at least one line span representing the projection onto that scan line of a graphics vector rendered in the video data, and wherein the graphics vector has a slope and the line span has a color and a width, the method comprising:

for a resultant video data set having a horizontal resolution less than h2, determining a color of an edge resultant pixel in a resultant scan line using, at least in part, the slope of the graphics vector at an edge sub-pixel; and directing the resultant video data set toward the display device;

wherein determining a color of an edge resultant pixel comprises:

determining whether the slope is less than 0.4; and based at least in part upon the determination, determining the color of the edge resultant pixel to be 50% of a color of an immediately adjacent prior sub-pixel plus 50% of the line span color;

the method further comprising:

determining a color of a second resultant pixel to be 25% of the color of the immediately adjacent prior sub-pixel plus 75% of the line span color.

4. A computer-implemented method of processing video data to be displayed on a display device having horizontal resolution h1 and vertical resolution v1, wherein the video data has horizontal resolution h2 and vertical resolution v2, wherein the video data comprises a plurality of scan lines, wherein at least one scan line has at least one line span representing the projection onto that scan line of a graphics vector rendered in the video data, and wherein the graphics vector has a slope and the line span has a color and a width, the method comprising:

for a resultant video data set having a horizontal resolution less than h2, determining a color of an edge resultant pixel in a resultant scan line using, at least in part, the slope of the graphics vector at an edge sub-pixel; and directing the resultant video data set toward the display device;

wherein h2=2h1 and v2=1.5v1, wherein the resultant video data set has a plurality of horizontal scan lines each representing a plurality of pixels, whereby the pixels are comprised by groups of three vertically-aligned pixels comprising a top pixel, a middle pixel, and a bottom pixel, each pixel having a color, the method further comprising:

for each group of three vertically-aligned pixels:

determining a color of a top resultant pixel to be 75% of the top pixel's color plus 25% of the middle pixel's color; and determining a color of a bottom resultant pixel to be 25% of the middle pixel's color plus 75% of the bottom pixel's color.

5. A graphics device, comprising:

a vector graphics rendering engine configured to produce video data to be displayed on a display device, wherein the video data comprises a horizontal resolution and a vertical resolution, wherein the horizontal resolution is twice a horizontal resolution of the display device, wherein the video data comprises a plurality of scan lines, wherein at least one scan line has at least one line span representing the projection on that scan line of a graphics vector rendered in the video data, and wherein the graphics vector has a slope and the line span has a color and a width; and at least one filter configured to receive the video data from the vector graphics rendering engine and determine a color of an edge resultant pixel in a resultant scan line using, at least in part, the slope of the graphics vector at an edge sub-pixel and direct a resultant video data set comprising the resultant scan line toward the display device;

wherein the at least one filter is further configured to determine the color of the edge resultant pixel at least in part by:

determining whether the slope is greater than or equal to 0.4 and whether the edge sub-pixel is at an even location; and based at least in part upon the determination, determining the color of the edge resultant pixel to be 25% of a color of an immediately adjacent prior sub-pixel plus 75% of the line span color.

6. A graphics device, comprising:

a vector graphics rendering engine configured to produce video data to be displayed on a display device, wherein the video data comprises a horizontal resolution and a vertical resolution, wherein the horizontal resolution is twice a horizontal resolution of the display device, wherein the video data comprises a plurality of scan lines, wherein at least one scan line has at least one line span representing the projection on that scan line of a graphics vector rendered in the video data, and wherein the graphics vector has a slope and the line span has a color and a width; and at least one filter configured to receive the video data from the vector graphics rendering engine and determine a color of an edge resultant pixel in a resultant scan line using, at least in part, the slope of the graphics vector at an edge sub-pixel and direct a resultant video data set comprising the resultant scan line toward the display device;

wherein the at least one filter is further configured to determine the color of the edge resultant pixel at least in part by:
  determining whether the slope is greater than or equal to 0.4 and whether the edge sub-pixel is at an odd location; and
  based upon the determination, determining the color of the edge resultant pixel to be 75% of a color of an immediately adjacent prior sub-pixel plus 25% of the line span color.

7. A graphics device, comprising:
a vector graphics rendering engine configured to produce video data to be displayed on a display device, wherein the video data comprises a horizontal resolution and a vertical resolution, wherein the horizontal resolution is twice a horizontal resolution of the display device, wherein the video data comprises a plurality of scan lines, wherein at least one scan line has at least one line span representing the projection on that scan line of a graphics vector rendered in the video data, and wherein the graphics vector has a slope and the line span has a color and a width; and at least one filter configured to receive the video data from the vector graphics rendering engine and determine a color of an edge resultant pixel in a resultant scan line using, at least in part, the slope of the graphics vector at an edge sub-pixel and direct a resultant video data set comprising the resultant scan line toward the display device;

wherein the at least one filter is further configured to determine the color of the edge resultant pixel at least in part by:
  determining whether the slope is less than 0.4; and
  based at least in part upon the determination, determining the color of the edge resultant pixel to be 50% of a color of an immediately adjacent prior sub-pixel plus 50% of the line span color.

8. A graphics device, comprising:
a vector graphics rendering engine configured to produce video data to be displayed on a display device, wherein the video data comprises a horizontal resolution and a vertical resolution, wherein the horizontal resolution is twice a horizontal resolution of the display device, wherein the video data comprises a plurality of scan lines, wherein at least one scan line has at least one line span representing the projection on that scan line of a graphics vector rendered in the video data, and wherein the graphics vector has a slope and the line span has a color and a width; and at least one filter configured to receive the video data from the vector graphics rendering engine and determine a color of an edge resultant pixel in a resultant scan line using, at least in part, the slope of the graphics vector at an edge sub-pixel and direct a resultant video data set comprising the resultant scan line toward the display device;

wherein the vertical resolution is 1.5 times a vertical resolution of the display device, wherein the resultant video data set has a plurality of horizontal scan lines each representing a plurality of pixels, whereby the pixels are comprised by groups of three vertically-aligned pixels comprising a top pixel, a middle pixel, and a bottom pixel, each pixel having a color, the graphics device comprising:
  at least a second filter configured to, for each group of three vertically-aligned pixels:
    determine a color of a top resultant pixel to be 75% of the top pixel's color plus 25% of the middle pixel's color; and
    determine a color of a bottom resultant pixel to be 25% of the middle pixel's color plus 75% of the bottom pixel's color.

9. A computer-readable medium having stored thereon:
code for receive video data to be displayed on a display device from a vector graphics rendering engine, wherein the video data comprises a horizontal resolution and a vertical resolution, wherein the horizontal resolution is twice a resolution of the display device, wherein the video data comprises a plurality of scan lines, wherein at least one scan line has at least one line span representing the projection on that scan line of a graphics vector rendered in the video data, and wherein the graphics vector has a slope and the line span has a color and a width; and code for determining, in a resultant data set, a color of an edge resultant pixel in a resultant scan line using, at least in part, the slope of the graphics vector at an edge sub-pixel;

wherein the resultant data set comprises a plurality of horizontal scan lines each representing a plurality of pixels, whereby the pixels are comprised by groups of three vertically-aligned pixels comprising a top pixel, a middle pixel, and a bottom pixel, each pixel having a color, the computer-readable medium further comprising:
  code for determining a color of a top resultant pixel to be 75% of the top pixel's color plus 25% of the middle pixel's color; and
  code for determining a color of a bottom resultant pixel to be 25% of the middle pixel's color plus 75% of the bottom pixel's color.

* * * * *

UNITED STATES PATENT AND TRADEMARK OFFICE
CERTIFICATE OF CORRECTION

| | |
|---|---|
| PATENT NO. | : 7,068,286 B2 |
| APPLICATION NO. | : 10/967095 |
| DATED | : June 27, 2006 |
| INVENTOR(S) | : Powell et al. |

It is certified that error appears in the above-identified patent and that said Letters Patent is hereby corrected as shown below:

Column 12, claim 9, line 29, after "thereon" insert --computer-executable instructions that program a computer to--

Column 12, claim 9, line 30, delete "code for"

Column 12, claim 9, line 41, delete "code for determining" and insert --determine--

Column 12, claim 9, lines 50-51, delete "further comprising" and insert --having stored thereon computer-executable instructions that further program the computer to--

Column 12, claim 9, line 52, delete "code for determining" and insert --determine--

Column 12, claim 9, line 55, delete "code for determining" and insert --determine--

Signed and Sealed this

Seventh Day of November, 2006

JON W. DUDAS
*Director of the United States Patent and Trademark Office*